United States Patent [19]

Borns et al.

[11] Patent Number: 5,106,266
[45] Date of Patent: Apr. 21, 1992

[54] DUAL ALLOY TURBINE BLADE

[75] Inventors: Frederick G. Borns, Chandler; Barry S. Bixler, Tempe, both of Ariz.

[73] Assignee: Allied-Signal Inc., Morris Township, Morris County, N.J.

[21] Appl. No.: 577,849

[22] Filed: Aug. 30, 1990

Related U.S. Application Data

[62] Division of Ser. No. 385,598, Jul. 25, 1989, abandoned.

[51] Int. Cl.$^5$ .............................................. F01D 5/28
[52] U.S. Cl. .................................. 416/241 R; 416/248
[58] Field of Search ..................... 416/241 R, 248.5; 415/200

[56] References Cited

U.S. PATENT DOCUMENTS

| | | | |
|---|---|---|---|
| 3,178,101 | 4/1965 | Morley et al. | 416/224 |
| 3,342,455 | 9/1967 | Fleck et al. | 29/156.8 B X |
| 3,697,192 | 10/1972 | Hayes | 416/96 |
| 3,713,752 | 1/1973 | Kurti | 416/219 |
| 3,720,480 | 3/1973 | Plowman et al. | 416/248 |
| 3,778,188 | 12/1973 | Aspinwall | 416/97 |
| 3,873,234 | 3/1975 | Penny | 29/156.8 B |
| 3,973,875 | 8/1976 | Bird | 416/241 |
| 4,343,593 | 8/1982 | Harris | 416/193 A |
| 4,417,854 | 11/1983 | Cain et al. | 416/241 |
| 4,787,821 | 11/1988 | Cruse et al. | 416/185 |
| 4,864,706 | 9/1989 | Jenkel | 29/156.8 B X |

FOREIGN PATENT DOCUMENTS

| | | |
|---|---|---|
| 0367958 | 5/1990 | European Pat. Off. |
| 2136170 | 12/1972 | France |
| 2027496 | 2/1980 | United Kingdom |

Primary Examiner—John T. Kwon
Attorney, Agent, or Firm—Jerry J. Holden; James W. McFarland; Robert A. Walsh

[57] ABSTRACT

A single crystal turbine blade has a portion of its attachment section reinforced by a core containing a fine grained, polycrystalline alloy. The blade is prepared by casting a single crystal body with a cavity within the attachment section, and then filling the attachment section with the polycrystalline superalloy to form a composite structure. Filling is preferably accomplished by plasma spraying the cavity with the superalloy, and hot isostatically compacting the sprayed superalloy to minimize porosity. The composite structure is then heat treated to develop an optimized microstructure in the dual alloy attachment section. The resulting turbine blade has improved low cycle fatigue life of the composite attachment section.

13 Claims, 1 Drawing Sheet

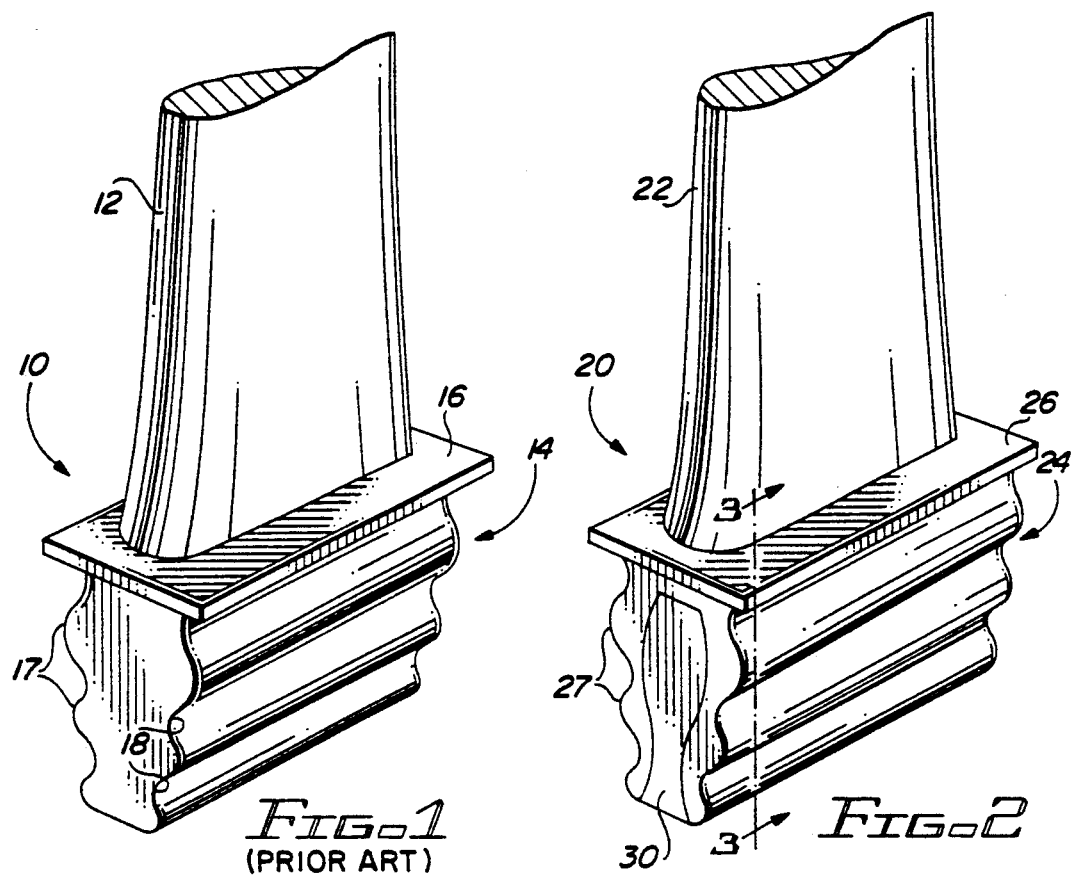
FIG-1 (PRIOR ART)
FIG-2
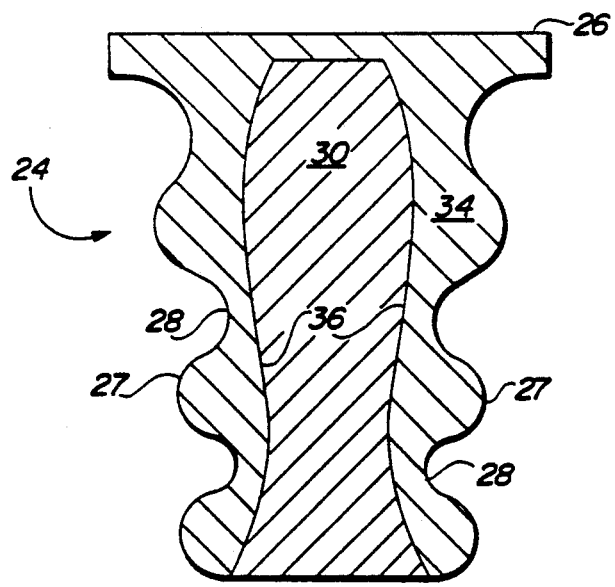
FIG-3

DUAL ALLOY TURBINE BLADE

This invention was made with U.S. Government the U.S. Department of the Air Force (ASD). The U.S. Government has certain rights in this invention.

This is a division of Ser. NO., 385,598, filed Jul. 25, 1989, now abandoned.

TECHNICAL FIELD

This invention relates generally to gas turbine power plants, and, more particularly, to turbine blades used in high performance gas turbine engines.

BACKGROUND OF THE INVENTION

Gas turbine power plants are used as the primary propulsive power source for aircraft, in the forms of jet engines and turboprop engines, as auxiliary power sources for driving air compressors, hydraulic pumps, etc. on aircraft, and as stationary power supplies such as backup electrical generators for hospitals and the like. The same basic power generation principles apply for all of these types of gas turbine power plants. Compressed air is mixed with fuel and burned, and the expanding hot combustion gases are directed against stationary turbine vanes in the engine. The vanes turn the high velocity gas flow partially sideways to impinge upon turbine blades mounted on a turbine disk or wheel that is free to rotate.

The force of the impinging gas causes the turbine disk to spin at high speed. Jet propulsion engines use this power to draw more air into the engine and then high velocity combustion gas is passed out the aft end of the gas turbine, creating forward thrust. Other engines use this power to turn a propeller or an electric generator.

The turbine blades and vanes lie at the heart of the power plant, and it is well established that in most cases, they are one of the limiting factors in achieving improved power plant efficiency. In particular, because they are subjected to high heat and stress loadings as they are rotated and impacted by the hot gas, there is a continuing effort to identify improvements to the construction and/or design of turbine blades to achieve ever higher performance.

Much research and engineering has been directed to the problem of improved turbine blade materials. The earliest turbine blades were made of simple cast alloys having relatively low maximum operating temperatures. The alloy materials have been significantly improved over a period of years, resulting in various types of nickel-based and cobalt-based superalloys that are in use today.

As the alloy materials were improved, the metallurgical microstructure of the turbine blades was also improved. First, the polycrystalline grain structures were modified by a wide variety of treatments to optimize their performance. Directionally solidified or oriented polycrystalline blades were then developed, having elongated grains with deformation-resistant orientations parallel to the radial axis of the blade in order to best resist the centrifugal stresses. Each of these advancements led to improved performance of the blades. Polycrystalline and oriented polycrystalline blades are widely used in most commercial and many military aircraft engines today.

It has been proposed to improve polycrystalline blades by including reinforcing ceramic fibers or the like in the structure but such approaches have not met with success primarily because of the problems in adequately bonding such differing materials so that operating stresses are evenly distributed.

More recently, single crystal turbine blades have been introduced as a result of the development of practical techniques to cast them in large quantities. These turbine blades have the advantage of eliminating grain boundaries entirely, which are one of the important causes of creep deformation and failure of the airfoil. The elimination of grain boundaries allows the chemical composition of the single crystal blade to be adjusted to achieve improved creep and high-cycle fatigue performance at the highest engine operating temperatures. Single crystal turbine blades are now used in high performance military aircraft and may eventually be introduced into commercial applications.

While the single crystal turbine blades have provided improved overall airfoil performance as compared with polycrystalline blades, they still exhibit problem areas. In many applications, the highly loaded attachment area is subject to low cycle fatigue failures. As a result, there is a continuing need to provide yet further improvements to achieve higher operating temperatures and lengthened operating lives in the blades used in high performance gas turbine engines.

It is therefore an object of the present invention to provide a novel turbine blade, and method of making same, which has an increased operating life.

Another object of the invention is to provide a single crystal turbine blade having a reduced susceptibility to failure in its attachment area.

A further object of the invention is to provide a composite structure in at least a portion of the attachment section of a single crystal turbine blade to retard creep and/or crack growth in said portion.

SUMMARY OF THE INVENTION

The present invention resides in an improved gas turbine blade that utilizes a single crystal alloy body, optimized for high temperature performance of the airfoil section, with a reinforcing polycrystalline alloy core within the interior of at least a portion of the attachment or root section in order to form a composite structure. The resulting turbine blade is physically interchangeable with prior blades, but has improved strength, stiffness and low cycle fatigue resistance in the attachment section.

While a turbine blade is a unitary structure, it may be conveniently described as having two sections: an airfoil section and an attachment or root section. The airfoil section is elongated and curved slightly into a shape suitable for reacting against the flow of the hot combustion gas. The root section attaches the airfoil section to the rotatable turbine disk or hub. The most widely used attachment is a "firtree" shape, wherein the attachment section of the blade has a series of enlarged ridges that fit into a conforming receptacle in the rim of the turbine disk. The blade is held in place by the physical interlocking of the ridges and the receptacles, yet is relatively easy to insert and remove when necessary.

The airfoil section of the turbine blade is subjected to a combination of stresses induced by centrifugal forces and hot gas impingement. Centrifugal forces induce slow creep deformation and, if rotational speeds are high enough, failure by stress rupture. Hot gas impingement combined with centrifugal loading can lead to high-cycle (low-amplitude strain) fatigue. The single crystal alloys have been optimized to resist these mechanisms of failure. However, it has been observed that the attachment section is susceptible to another, completely different failure mechanism: low cycle (high amplitude strain) fatigue. Existing single crystal turbine blades have their lives limited, in many cases, by this low cycle fatigue mode. Because the turbine blade single crystal alloy is optimized to resist other failure mechanisms, low cycle fatigue failure of the attachment section becomes a more prominent concern in high performance gas turbine engines.

While the inventors do not wish to be held to any particular theory, it is believed that the source of the low cycle fatigue performance improvement arises from the inherent differences between the lower modulus single crystal and higher modulus polycrystalline microstructures. Low cycle fatigue occurs under conditions of high cyclic load and the related large plastic strains. The absence of grain boundaries in the softer single crystal material has the effect of increasing the strain at any given stress and eliminating a major microstructural restraint to the growth of micro cracks which are formed during high plastic strain. The fine grained polycrystalline core material is much stiffer and therefore attracts a larger share of the radial load being transferred through the blade. This reduces the critical stresses in the softer single crystal material of the attachment areas and increases the low cycle fatigue life of the composite blade.

In accordance with the present invention, a turbine blade comprises a low modulus, cast single crystal body having an airfoil section and an attachment section, and a higher modulus structural core of a polycrystalline alloy bonded within said attachment section.

The turbine blade of the present invention has a single crystal body having a composition, orientation, and structure optimized to provide excellent creep and highcycle fatigue resistance in the airfoil section. This blade is grown by existing single crystal growth techniques, such as those reported in U.S. Pat. Nos. 4,412,577 and 3,494,709, whose disclosures are incorporated herein by reference. However, the blade is grown with the attachment section containing a hollow cavity. Alternately, a cavity may be later machined into the blade.

A core of a polycrystalline superalloy is applied within the center of the attachment section. The thickness, composition and microstructure of the core are optimized to be resistant to low cycle, moderate temperature fatigue damage and other failure mechanisms that are predominant in the attachment section. The entire attachment section is preferably not made of the polycrystalline material. The lower-modulus single-crystal material receives the airfoil attachment load from the stiffer, higher-modulus, polycrystalline core. Notch-root stresses are minimized in the single crystal material by the support provided by the high-modulus core. Reduced notch-sensitivity is also achieved by the use of the low-modulus single-crystal material.

The polycrystalline core can be applied by any number of techniques, but preferably by plasma spraying. The core material can then be metallurgically refined to improve the microstructure to be more resistant to failure, for example by hot isostatic pressing or heat treating.

In accordance with the processing aspect of the present invention, a process for preparing a turbine blade generally comprises the steps of casting a single crystal body having an airfoil section and an attachment section, forming a cavity within the core of the attachment section, reinforcing the core of the attachment section by filling the cavity with a polycrystalline alloy, metallurgically refining the polycrystalline core and, finally, machining the attachment section into a desired final configuration for attachment to a turbine disk. In a preferred approach, a process for preparing a turbine blade comprises the steps of casting a single crystal body having an airfoil section and an attachment section, plasma spraying a high strength polycrystalline alloy into a core cavity formed within the central portion of the attachment section, and hot isostatic pressing the body to consolidate the polycrystalline alloy core.

In the most preferred approach, the single crystal portion of the blade is of SC180 composition superalloy (described in EPO Patent Appln. No. 246,082) having a [001]crystallographic orientation parallel to the blade's longitudinal axis. The polycrystalline core is preferably of U-720 superalloy since its composition is compatible to SC180. The polycrystalline core is applied by vacuum plasma spray deposition and then consolidated by hot isostatic pressing, so that the core is dense and well bonded to the single crystal portion of the attachment section.

It should be appreciated that the turbine blade of the invention achieves improved performance and life by incorporating the best features of two different approaches while minimizing the detractions of each. Optimized airfoil section performance is attained by using an optimized single crystal alloy, and optimized attachment section performance is attained by using an optimized polycrystalline alloy in the core to provide additional strength. This composite structure behaves in a complex fashion which is not entirely predictable by only considering the individual properties of the single crystal material or the polycrystalline material. Initially the single crystal layer resists the centrifugal stresses but after some small amount of creep, the stresses are transferred into the stronger polycrystalline core. Other features and advantages of the present invention will be apparent from the following more detailed description of a presently preferred embodiment, taken in conjunction with the accompanying drawings, which illustrate, by way of example and not limitation, the principles of the invention.

BRIEF DESCRIPTION OF THE DRAWINGS

FIG. 1 is a perspective view of a conventional single crystal turbine blade;

FIG. 2 is a perspective view of a composite turbine blade of the present invention; and FIG. 3 is an enlarged cross-sectional view through the attachment region of the blade shown in FIG. 2.

DETAILED DESCRIPTION OF THE PREFERRED EMBODIMENT

By way of background, FIG. 1 illustrates a prior single crystal turbine blade (10). The blade (10) has an airfoil section (12), an attachment or root section (14), and, usually, a platform or stabilizer (16) between the two sections. The attachment section (14) has the pattern of alternating ridges (17) and depressions (18) that form a "firtree" shape for removable attachment to complementary grooves in a turbine disk (not shown). The blade (10) is fabricated entirely of a piece of single crystal superalloy, preferably with a [001]crystallographic direction parallel to the blade's longitudinal axis.

As used herein, a single crystal article is one in which substantially all of the article has a single crystallographic orientation through the load bearing portions, without the presence of high angle grain boundaries. A small amount of low angle grain boundaries, such as tilt or twist boundaries, are permitted within such a single crystal article, but are preferably not present. However, such low angle boundaries are often present after solidification and formation of the single crystal article, or after some deformation of the article during creep or other light deformation process. Other minor irregularities are also permitted within the scope of the term "single crystal". For example, small areas of high angle grain boundaries may be formed in various portions of the article, due to the inability of the single crystal to grow perfectly near corners and the like. Such deviations from a perfect single crystal, which are found in normal commercial production operations are within the scope of the term "single crystal" as used herein.

FIG. 2 illustrates a dual alloy, dual structure turbine blade (20), which also has an airfoil section (22), an attachment section (24), and a platform or stabilizer (26). The attachment section (24) has a firtree of the same outward configuration and dimensions as the firtree of the prior blade (10). The physical appearance and configuration of the blade (20) may be identical with that of a prior blade (10), so that the improved blade can directly replace the prior blade in existing turbine wheels.

From the enlarged cross-sectional illustration of FIG. 3, however, it is apparent that the structure of the blade (20) differs from that of the blade (10). The airfoil sections (12) and (22) are identical, but the attachment sections (14) and (24) are not metallurgically identical. The attachment section (24) is formed with a polycrystalline core (30) that extends from the base of the blade up towards the platform (26) beyond the firtree. The core (30) is preferably formed of a size just smaller than the entire attachment section (24) but large enough to provide reinforcement thereto. The core (30) preferably tapers sufficiently to form a mechanical interlocking structure with the outer layer of single crystal material. Overlying the core (30) is at least a thin layer of the single crystal material (34). The layer (34) has its external configuration machined with the same ridges (27) and grooves (28) as the prior art blade (10). The polycrystalline metallic alloy core (30) must be metallurgically bonded to the single crystal along the interfacial bond lines (36) without substantial porosity or defects.

The single crystal material may be any acceptable superalloy that can be prepared as a single crystal. The preferred single crystal materials are those that have compositions tailored to yield optimal high temperature properties in the single crystal airfoil section (22) but have a relatively low modulus in the transverse [100]grain direction. The most preferred single crystal material is an alloy known as SC180, disclosed in European Patent Application No. 246,082. In its most preferred form SC180 has a nominal composition of about 10% Co, 5% Cr, 1.7% Mo, 5% W, 8.5% Ta, 5.2% Al, 3% Re, 1.0% Ti, 1.0% Hf and the balance nickel. Its modulus is relatively low at about $14.8 \times 10^6$ in/in. The crystalline orientation of the single crystal is preferably with the [001]direction parallel to the blade's longitudinal axis. Other acceptable single crystal materials are well known in the art. See, for example, U.S. Pat. Nos. 4,582,548; 4,643,782; and 4,719,080.

The polycrystalline material for use in the core (30) may be any acceptable superalloy that can be prepared with a fine grain size. The preferred polycrystalline materials are those that have compositions, grain sizes, and processing optimized to yield maximum performance as an attachment section alloy. This criterion implies an alloy having high strength and excellent low cycle fatigue performance. The most preferred polycrystalline material is U-720 which has a nominal composition of about 14.5% Co, 18.0% Cr, 3.0% Mo, 1.2% W, 2.5% Al, 5.0% Ti and minor amounts of B, C, and Zr in a nickel matrix. This alloy has a relatively high modulus of about $28.2 \times 10^6$ in/in. In addition, the chemical composition is similar enough to SC180 to minimize phase instability near the interfacial bond line (36). Other acceptable polycrystalline superalloys include, but are not limited to well-known wrought disk alloys such as those sold under the trademarks or tradenames MAR M-247, Waspoloy, IN-100, and Astroloy.

The turbine blade of the invention is fabricated by first casting a single crystal piece having the shape of the airfoil section (22), platform (26), and preferably a channel or cavity for the tapered core (30) in the attachment section (24). If the cavity is not formed during the casting process, it may later be electrochemically machined into the solid attachment section (24). A more preferred process is to initially cast a small undersized cavity in the blade and then later machine the cavity to a desired final size and shape to ensure greater uniformity in production blades.

Any fabrication technique which produces a substantially single crystal article is operable in conjunction with the present invention. The preferred technique, used to prepare the single crystal articles described herein, is the high thermal gradient solidification method. Molten metal of the desired composition is placed into a heat resistant ceramic mold having essentially the desired shape of the final fabricated component. The mold and metal contained therein are placed within a furnace, induction heating coil, or other heating device to melt the metal, and the mold and molten metal are gradually cooled in a controlled temperature gradient. In this process, metal adjacent the cooler end of the mold solidifies first, and the interface between the solidified and liquid metal gradually moves through the metal as cooling continues. Such gradient solidification can be accomplished by placing a chill block adjacent one end of the mold and then turning off the heat source, allowing the mold and molten metal to cool and solidify in a temperature gradient. Alternatively, the mold and molten metal can be gradually withdrawn from the heat source.

It is known that certain preferred crystallographic orientations such as [001]can be grown to the exclusion of others during such a gradient solidification process, so that a single grain becomes dominant throughout the article. Techniques have been developed to promote the formation of the single crystal orientation rapidly, so that substantially all of the article has the same single crystal orientation. Such techniques include seeding, described in U.S. Pat. No. 4,412,577, whereby an oriented single crystal starting material is positioned adjacent the metal first solidified, so that the metal initially develops that orientation. Another approach is a geometrical selection process such as described in U.S. Pat. No. 3,494,709.

As indicated, all other techniques for forming a single crystal are acceptable for use in conjunction with the present invention. The floating zone technique may be used wherein a molten zone is passed through a polycrystalline piece of metal to produce a moving solidification front. Solid state techniques are also permitted wherein a solid piece of polycrystalline material is transformed to a single crystal in the solid state. The solid state approach is not preferred because it is typically slow and produces a relatively imperfect single crystal.

The polycrystalline core (30) is applied by any technique that produces a sound microstructure that is well bonded to the underlying single crystal substrate. The preferred approach is vacuum plasma spray deposition. The target to be coated, here the tapered cavity of the blade (20), is placed into a vacuum chamber which is evacuated to a relatively low pressure. A plasma gun that melts metal fed thereto is aimed at the target substrate, typically positioned several inches from the plasma gun. Particles of metal of the desired final composition are fed to the plasma gun, which melts, or at least softens, the particles and propels them toward the target to impact thereupon. Different blends of particles can also be used, but a single particulate feed material is preferred for uniformity.

The plasma deposition process is continued for as long as necessary to fill up the core cavity. By way of example and not of limitation, a typical blade (20) may be 2 to 4 inches long, and the depth of the core (30) may be about 0.5 to 1.5 inches.

Such a blade was analyzed and calculated to have about 10% less stress in the attachment grooves (28) which would increase the low cycle fatigue life of the attachment section by a factor of about 2. Of course other blade designs will have to be analyzed to determine the optimum proportions for the core and the amount of increased life provided thereby.

The as-deposited core may have a slight degree of porosity and possibly unmelted particles. To remove the porosity and irregularities, the blade (20) is placed into a pressure chamber and hot isostatically pressed. The hot isostatic pressing is conducted at an elevated pressure, typically 15,000 to 25,000 pounds per square inch, and at an elevated temperature, typically 1975° F. to 2230° F., for a sufficient time, such as 4 hours. The exact temperature and time may vary depending upon heat treatment requirements for the single crystal and the core materials. An acceptable and preferred hot isostatic pressing treatment is 2230° F. and 15,000 pounds per square inch for 4 hours. Upon completion of this treatment the porosity in the core should be completely closed, with good bonding at the bond line (36). After pressing, the composite blade is preferably solution heat-treated and aged at about 2300° F. to 1200° F. (more preferably 1400° F. to 1600° F.) to optimize the polycrystalline microstructure. Care must be taken to avoid incipient melting of the single crystal material, and the appropriate combination of pressing and heat treatment parameters will depend upon the materials selected for the single crystal and polycrystalline core in any particular case.

Any other acceptable procedure may also be used to fill the single crystal cavity with the polycrystalline material. Such other techniques include, but are not limited to, vapor deposition, plasma transfer arc, electrodeposition, deposition from solution, and powder spraying.

As should now be appreciated, the turbine blades of the invention provide an improved dual alloy composite structure and therefore improved performance compared to prior blades. Although a particular embodiment of the invention has been described in detail for purposes of illustration, various modifications may be made without departing from the spirit and scope of the invention. example, some stationary vanes or other components in a turbine engine may experience attachment problems which could be solved by adding a reinforcing core of polycrystalline alloy. Accordingly, the invention is not to be limited except as by the appended claims.

What is claimed is:

1. A composite turbine blade comprising:
   a single crystal airfoil section; and
   a composite attachment section having a layer of single crystal material substantially surrounding a polycrystalline alloy core.

2. The turbine blade of claim 1 wherein said polycrystalline core has a greater modulus than said single crystal layer and said single crystal airfoil section.

3. The turbine blade of claim 1 wherein said core of polycrystalline alloy at least doubles the low cycle fatigue life of the attachment section as compared to a blade of the same size and shape but without such a core.

4. The turbine blade of claim 1 wherein said polycrystalline alloy is selected from the group consisting of MAR M-247, U-720, IN-100, Astroloy and Waspoloy.

5. The turbine blade of claim 1 wherein said polycrystalline alloy has been consolidated by hot isostatic pressing.

6. The turbine blade of claim 1 wherein said core is tapered to mechanically interlock with said single crystal body.

7. The turbine blade of claim 1 wherein the polycrystalline alloy is U-720.

8. The turbine blade of claim 1 wherein he orientation of the single crystal material has its (001) crystallographic axis parallel to the longitudinal axis of the blade section.

9. The turbine blade of claim 1 wherein said single crystal layer is integral with said single crystal airfoil section.

10. The turbine blade of claim 1 wherein said single crystal layer is metallurgically bonded to said polycrystalline alloy core.

11. The turbine blade of claim 10 wherein said metallurgical bond occurs along interfacial bond lines between said layer and said core.

12. The turbine blade of claim 1 wherein said single crystal layer has an exterior surface configuration for removably attaching said blade to a complementary groove in a turbine disk.

13. The turbine blade of claim 12 wherein said exterior surface configuration is a fir-tree configuration.

* * * * *